United States Patent
Kotzin

(10) Patent No.: US 7,200,119 B2
(45) Date of Patent: Apr. 3, 2007

(54) METHOD AND APPARATUS FOR PROVIDING A DOWNLINK PERFORMANCE BENEFIT IN A COMMUNICATIONS SYSTEM

(75) Inventor: Michael D. Kotzin, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 1035 days.

(21) Appl. No.: 10/184,172

(22) Filed: Jun. 28, 2002

(65) Prior Publication Data

US 2004/0001463 A1   Jan. 1, 2004

(51) Int. Cl.
*H04Q 7/20* (2006.01)
(52) U.S. Cl. ...................... 370/252; 455/522
(58) Field of Classification Search ............... 370/241, 370/252; 455/522
See application file for complete search history.

(56) References Cited

U.S. PATENT DOCUMENTS

| 6,950,406 B2* | 9/2005 | Chen et al. ................ 370/252 |
| 2003/0023412 A1* | 1/2003 | Rappaport et al. ............ 703/1 |
| 2005/0208961 A1* | 9/2005 | Willenegger ............... 455/522 |

* cited by examiner

*Primary Examiner*—Melvin Marcelo
(74) *Attorney, Agent, or Firm*—Charles W. Bethards

(57) ABSTRACT

A method within and subscriber unit that is arranged and constructed for realizing a performance benefit in a communications system that controls performance includes: a receiver for receiving a downlink signal; a processor coupled to the receiver for determining a performance metric corresponding to the downlink signal that complies with air interface requirements for the communications system; a transmitter for reporting the performance metric on an uplink channel; and a receiver processor for processing the downlink signal to provide a received signal having an improved performance metric.

20 Claims, 2 Drawing Sheets

METHOD AND APPARATUS FOR PROVIDING A DOWNLINK PERFORMANCE BENEFIT IN A COMMUNICATIONS SYSTEM

FIELD OF THE INVENTION

This invention relates in general to communication systems, and more specifically to a method and apparatus for providing a downlink performance benefit therein.

BACKGROUND OF THE INVENTION

Communications systems with managed performance on outbound or downlink channels and inbound or uplink channels are becoming more common. This is particularly true for systems that are designed and deployed from the ground up to be interference limited. Being interference limited means that system capacity ultimately depends on the interference at one subscriber or wireless communications unit that results from providing service to other such units. Many systems, such as cellular phone or wireless phone systems that seek to provide satisfactory service to the most units most of the time are interference limited systems.

More recent systems in an effort to maximize system capacity devote significant system overhead to managing downlink signal to interference plus noise ratios (SINR) or link margins such that the power that is used to transmit the downlink signal will be just sufficient to transfer information. A classic example of systems that manage downlink SINR to be just sufficient in order to maximize capacity is IS-95 CDMA (code division multiple access) systems. Determining what is just sufficient is unfortunately a subjective decision that systems designers end up making for the system users. For example a 1% FER (frame error rate) is the target for the downlink performance in IS-95 CDMA systems.

In order to maintain the target SINR the IS-95 air interface standards require that a subscriber unit report performance data corresponding to FER so that the downlink power or SINR can be adjusted to just maintain data transfer at this error rate. If a subscriber device manufacturer discovers a way of improving downlink receiver performance and convinces a user to buy the new receiver, the system automatically takes advantage of the improvement by managing the downlink for this subscriber unit to the 1% FER target and the user does not get any benefit from the improved performance that they may very well have paid for. Thus a situation exists where there is no individual motivation for the collective good and subscriber devices end up evolving to the lowest common denominator in performance. Clearly a need exists for apparatus and methods that can provide a downlink performance benefit in such systems.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF PREFERRED EMBODIMENTS

Figure 1:
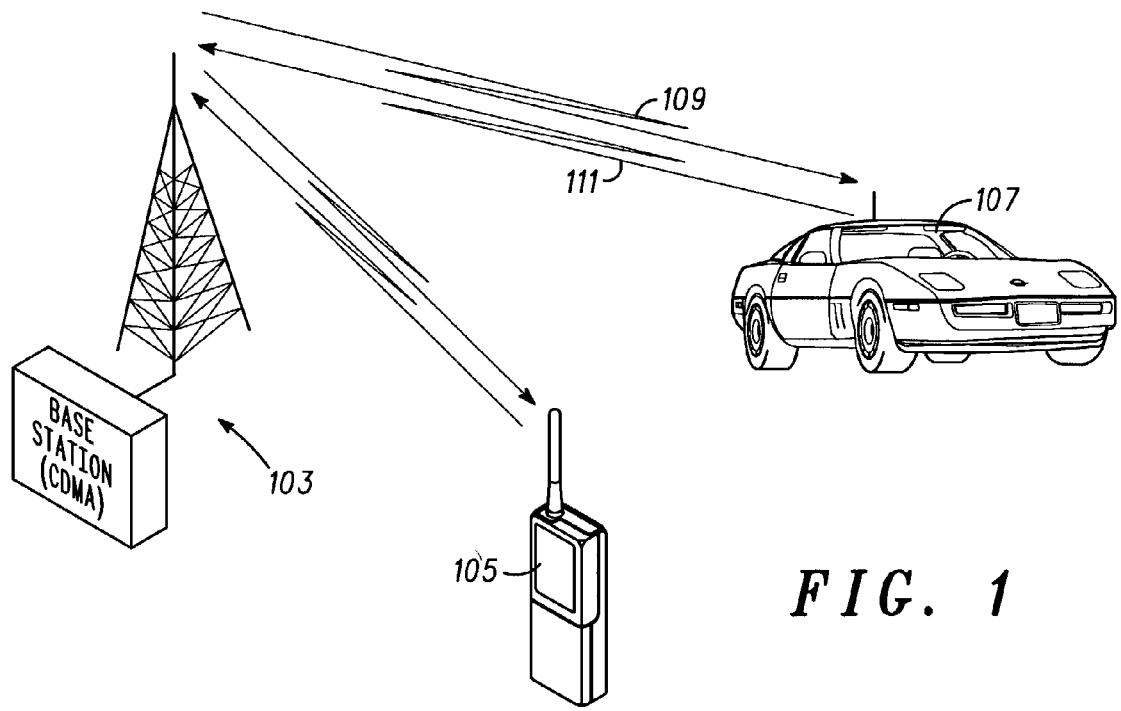
FIG. 1 depicts, a simplified and exemplary system diagram for setting the context within which the present invention operates.

In overview form the present disclosure concerns communications systems that provide services and specifically communications services such as cellular phone services to wireless communications units or more specifically subscriber units or devices and users thereof. More particularly various inventive concepts and principles embodied in apparatus and methods for providing or realizing a performance benefit at a subscriber or system level are discussed and described. The communications systems of particular interest are those being deployed and developed such as GSM, GPRS, IS-95 CDMA, CDMA 2000, IDEN, 2.5G or EDGE, and 3G or W-CDMA (UMTS) systems that use modulation formats such as QPSK, DQPSK, OQPSK, BPSK, QAM, and spread spectrum or variations and evolutions thereof that are suitable for or use performance controlled downlinks in order to improve system capacity or reduce system interference levels. As further discussed below various inventive principles and combinations thereof are advantageously employed to take advantage of improved subscriber unit performance and adjust transmission characteristics in accordance therewith in a fashion that motivates improved subscriber performance, thus alleviating various problems associated with known systems while still facilitating large system capacities when appropriate, provided these principles or equivalents thereof are utilized.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the preferred embodiments.

Referring to FIG. 1 a simplified and exemplary system diagram for setting the context within which the present invention operates will be discussed and described. While the preferred embodiments will refer to code division multiple access (CDMA) systems and devices within such systems the principles and concepts herein will find application in many modern systems with managed or controlled power and thus performance levels. FIG. 1 shows a base station 103 that is coupled to a base station controller (not shown) and a mobile switch controller (not shown) and thus to the public switched telephone or other network to facilitate services for subscriber or wireless units such as the cellular handset 105 or mobile unit 107. Service is provided to each subscriber unit using a downlink channel such as the representative channel 109 and an uplink channel such as the exemplary channel 111.

In order to control or limit interference at one unit resulting from the signal intended for another subscriber unit, the power of the signal on the downlink channel for the intended unit is usually controlled in order to just be able to transfer information. The particular level or target performance level may vary depending on system loading but can be as low as 1% FER for an IS-95 CDMA system. This results in controlled performance for the intended subscriber unit as the channel power will be set at just above a level to maintain "adequate" link margin for data transfer. To ensure that the power level is maintained, air interface specifications or standards require the subscriber unit to report performance levels or a direction in which to adjust power such that the target performance levels (bit error rates, frame error rates, EbNo (energy per bit/Noise power per bit), etc.) are maintained but not exceeded. This performance metric is reported by the subscriber unit on the uplink channel. So generally the subscriber unit receives a signal on the downlink channel, assesses or determines a performance metric that is then transmitted or sent to the base station and used to adjust the power level on the downlink channel so the receiver just operates at a targeted performance level. It does no good to get a better subscriber unit or one that has better performance as the system will just use the extra performance and lower the power level to the device. For example, if the handset 105 and the mobile device 107 were at exactly or nearly the same location and the mobile was using an external antenna it is likely that the power level sent to the mobile would be lower than that sent to the handset because the typical external antenna is likely more efficient than the handset antenna. By the same token if the mobile unit were really a handset inside of the automobile the power level to that handset may well be higher than to the handset 107 as the automobile may be acting as a shield for the signal to the handset that is inside. Since the system coops the benefit of the external antenna there is little or no motivation for the user of the automobile to go the trouble and expense of having an external antenna. For the same reasons there is no motivation to acquire or produce improved performance handsets as the end user does not enjoy or experience any benefit.

Figure 2:
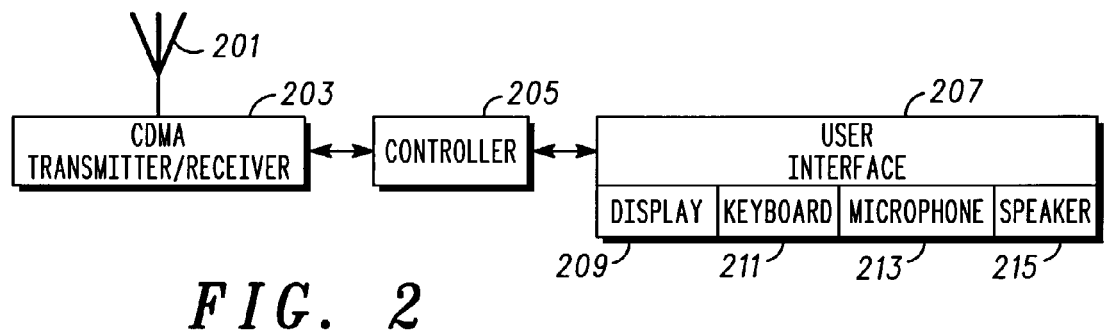
FIG. 2 depicts a block diagram of a preferred embodiment of a subscriber unit according to the present invention.

Referring to FIG. 2 a basic block diagram of a preferred embodiment of a subscriber unit will be discussed and described. At the basic level depicted the block diagram is known and representative of the functional lineup for most subscriber units including CDMA units such as the handset 105 and mobile 107. By replacing the CDMA transceiver with another transceiver the block diagram will depict and demonstrate subscriber units suitable for other access technologies. As depicted the subscriber unit includes an antenna structure 201 for radiating radio frequency signals from a transmitter and absorbing or receiving radio frequency signals for a receiver, the transmitter and receiver each being a portion of a transceiver 203. Here the transceiver has improved performance via one of a plurality of known techniques, one of which is discussed below with reference to FIG. 3.

The transceiver is inter coupled to a controller 205 that operates typically under processor control to control the transceiver and provide proper signals to and from the transceiver. The transceiver and controller are cooperatively arranged to realize some or all of the performance advantage of the transceiver even when operating in a communications system with performance control. The controller 25 is also inter coupled to a user interface 207 that includes, for example, a display 209, a keyboard 211, a microphone 213, and a speaker 215 all generally known. The user interface will support by the display and keyboard user discretionary decision noted below.

Figure 3:
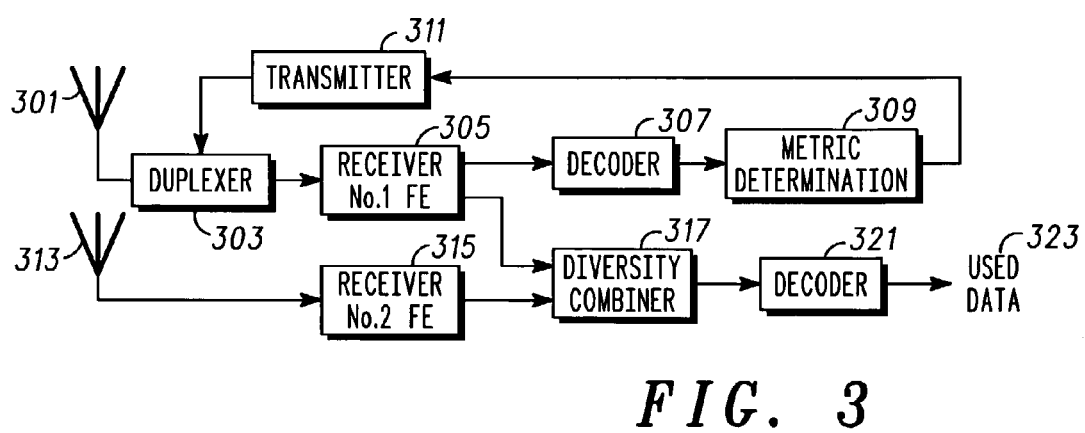
FIG. 3 depicts a more detailed block diagram of a preferred embodiment of a portion of a transceiver within the FIG. 2 subscriber unit according to the present invention.

Referring to FIG. 3 a more detailed block diagram of a preferred embodiment of a portion of the transceiver within the subscriber unit of FIG. 2 will be discussed and described. Generally FIG. 3 depicts a diversity receiver arrangement using receiver front-end combining for a performance advantage or improvement and an inventive arrangement of separately assessing performance for conventional non-diversity receiver architecture. This facilitates a subscriber unit that is arranged and constructed for realizing a performance benefit in a communications system with controlled performance. As depicted, antenna 301 couples radio frequency energy, such as a down link signal through a duplexer 303 to a first receiver front end 305 for receiving the signal.

The first receiver front end 305 provides amplification, selectivity or filtering, and down conversion processes to convert the radio frequency signal, such as a CDMA downlink signal to a base band signal that is then demodulated to provide symbols. These symbols are coupled to a processor, including the decoder 307 for converting the symbols to digital data and the metric determination function 309 that receives the data and determines a performance metric corresponding to the downlink signal. In many systems such as IS-95 CDMA in order to limit the uplink channel overhead devoted to controlling power or downlink performance the performance metric may simply be an indication as to whether the power needs to be increased or decreased in order to maintain the target performance at a specified level, for example 1% FER when the system is loaded. The functions discussed above are known and will provide a performance metric that complies with an air interface requirement, such as the IS-95 CDMA air interface standard, for the communications system. In any event the performance metric is then coupled to a transmitter 311 that transmits or reports, via the duplexer 303 and the antenna 301 the performance metric on an uplink channel. This reported performance metric is used by the system to adjust the power output from a base transmitter and thus the signal power on the downlink channel.

The remainder of the FIG. 3 apparatus operates together with some of the above blocks such as the antenna 301 and first receiver front end 305 operate as a receiver processor for processing the downlink signal to provide a received signal with improved performance or an improved performance metric. Antenna 313 is coupled to a second receiver front end 315 and operates similarly to antenna 301 to couple a radio frequency signal such as the downlink signal to the front end 315. However this antenna will be suitably spaced from antenna 301 in order to realize diversity gain or improvement in receiver performance often referred to as diversity gain. The second receiver front end 315 operates in the same fashion as the first receiver front end 305 for the same purposes. An output from the second receiver front end 315 as well as an output from the first receiver front end are each coupled to a diversity combiner 317 where the two signals are combined according to known techniques to provide a composite signal to the decoder 321. Decoder 321 operates to decode symbols and provide useable or used data 323 to the balance of the subscriber unit.

Because of the diversity gain enjoyed, on the order of 3 dB, when two receivers with properly positioned antennas and properly combined output signals are used the output data from decoder 321 will have dramatically improved FER relative to the output from decoder 307. For example, given the vocoders that are used in IS-95 CDMA systems to convert voice to and from a corresponding digital representation, most users will notice and many find objectionable so called voice artifacts in a heavily loaded system, e.g. at a 1% FER performance level. The extra performance provided by diversity has been shown to all but eliminate these artifacts. Also note that this performance level or metric does not affect what is reported to the system and thus the system will not use the performance improvement for its own purposes (capacity improvement) by lowering the downlink channel power.

To review we have discussed and described a subscriber unit that is arranged and constructed for realizing a performance benefit in a communications system with controlled performance. The subscriber unit includes a receiver 305, 307 for receiving a downlink signal, such as CDMA downlink signal, and a processor 309 coupled to the receiver, for determining a performance metric corresponding to the downlink signal that complies with air interface requirements, such as 1% FER, for the communications system. Further included is a transmitter 311 for reporting the performance metric on an uplink channel and a receiver processor (combination of receiver front ends 305, 315, combiner 317, and decoder 317) for processing the downlink signal to provide a received signal having improved performance or an improved performance metric.

The receiver and the processor for determining the performance metric corresponding to the downlink signal operates in parallel with the receiver processor for processing the downlink signal to provide a received signal having an improved performance metric. The receiver for receiving the downlink signal and the processor for determining the performance metric corresponding to the downlink signal use a first receiver front end 305 and a first decoder 307 and the receiver processor for processing the downlink signal uses the first receiver front end and a second receiver front end 315 with outputs that are combined and decoded to provide the received signal having the improved performance or metric.

Further note that one of ordinary skill given the principles and concepts herein disclosed could readily add an offset to the threshold determination function 309 and thereby determine and report the performance metric to exceed the air interface requirements (e.g. report a performance metric that was better than the one actually determined based only on the output of decoder 307) but still not equal to the improved performance metric. All sorts of economically motivated scenarios are opened up. For example a user purchases a subscriber unit with this performance improvement or benefit and as part of the purchase also agrees to toll charges associated with service from the communications system that are inversely dependent on or correlated to the degree that the performance metric approaches the improved performance metric. Perhaps three settings are allowed one where the reported performance metric complies with air interface standards meaning that the subscriber unit enjoys all of the performance benefits, one where it lies between the compliance level and the improved level meaning that the subscriber and the system or system operator each enjoy a portion of the benefit, and one where the system enjoys the complete benefit with presumably progressively lower tolls. It should be further noted that schemes, other than receive diversity, exist to improve performance or provide a performance benefit such as having the receiver processor uses either a joint detection decoder or pilot interference cancellation to provide the received signal having the improved performance metric.

Figure 4:
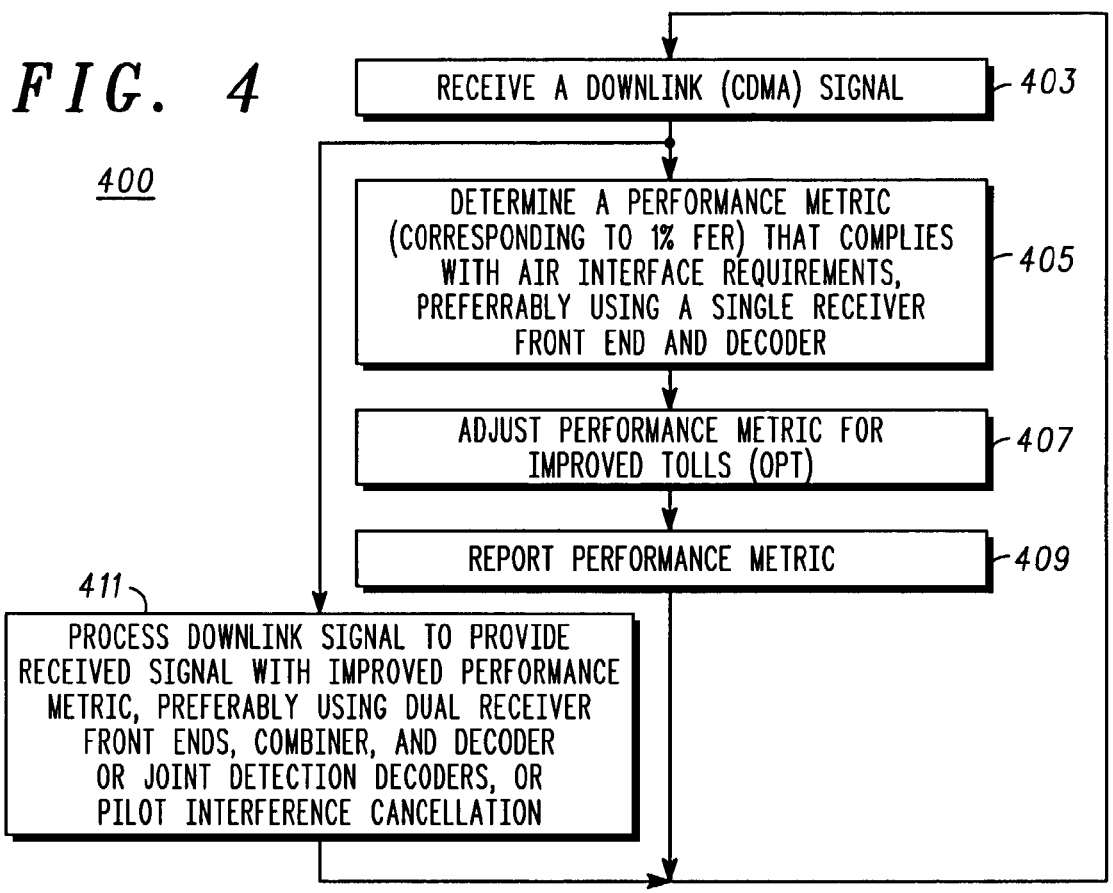
FIG. 4 illustrates a flow chart of a preferred method embodiment of realizing a performance benefit at a subscriber unit according to the present invention and FIG. 5 illustrates a flow chart of a preferred method embodiment of realizing a performance benefit within a system according to the present invention.

Referring to FIG. 4 a flow chart of a preferred method embodiment of realizing a performance benefit at a subscriber unit will be discussed and described. Much of this discussion will be in the nature of a review as many of the concepts and principles have been discussed above. This method is suitable for being performed and closely analogous to the method performed by the subscriber units reviewed with reference to FIG. 2 and FIG. 3. The flow chart demonstrates a method 400 of realizing a performance benefit at a subscriber unit in a communications system with controlled performance and begins at 403 with receiving a downlink signal, such as a CDMA downlink signal and then at 405 determining a performance metric corresponding to the downlink signal that complies with air interface requirements for the communications system, such as the previously mentioned 1% FER. These two processes preferably use a single receiver front end and decoder as noted above. The performance metric is optionally adjusted to improve tolls for service at 407 by selecting a performance metric somewhere between the performance metric from 405 and an improved metric from the process at 411 described below. At 409 this performance metric is reported. Preferably in parallel with 405–409 at 411 processing the downlink signal to provide a received signal having an improved performance metric is undertaken. This process 411 can use diversity reception with two receiver front ends, a combiner, and decoder to realize the improved performance. Alternatively joint detection decoders or pilot interference cancellation can be employed in a CDMA system.

Figure 5:
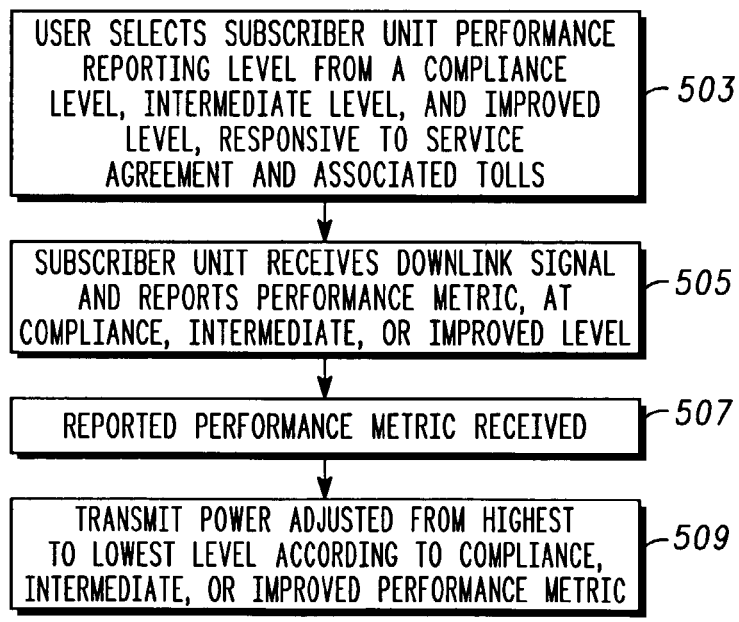

Referring to FIG. 5 a flow chart of a preferred method embodiment of realizing a performance benefit within a system will be discussed and described. Again much of this material will be a review of the above discussed principles and concepts but more from the perspective of the system than from the subscriber unit. A method 500 of realizing a performance benefit in a system with controlled performance is shown where the benefit is due to or results from a subscriber unit or more likely a plurality of such subscriber units having improved performance. The method begins at 503 with the user of the subscriber unit selecting a performance reporting level from a plurality of choices such as a compliance level, intermediate level, and an improved level, responsive to perhaps a service agreement or tolls associated with each level.

Then subscriber unit then at 505 receives a downlink signal and reports a performance metric based on the choice made at 503. Then 507 shows receiving, from the subscriber unit the performance metric. This metric will be either a first performance metric corresponding to a downlink signal that complies with air interface requirements for the communications system or a second performance metric corresponding to the downlink signal that exceeds the air interface requirements for the communications system and may be a performance metric representative of an improved performance metric corresponding to all of the improved performance from the subscriber. Then 509 shows adjusting a transmit power to a first level for the downlink signal when the first performance metric is received and to a second level that is less than the first level when the second performance metric is received, thereby marginally improving capacity for the system. Note the choice of which performance metric to report from the subscriber unit can be at the discretion of the user, the discretion exercised at the time of purchase or during a telephone call. The latter will require some manner of letting the system know which metric is being selected if tolls are going to be correlated on the fly to the metric.

The processes and apparatus discussed above and the inventive principles thereof are intended to and will alleviate problems caused by prior art performance controlled systems. Using these principles of enabling a user of a subscriber unit to enjoy performance benefits and factoring in various other attributes including commercial considerations is expected to facilitate user satisfaction and further motivate improved system capacities. It is expected that one of ordinary skill given the above described principles, concepts and examples will be able to implement other alternative benefit realization procedures that are subscriber unit or system characteristic dependent and that will also offer or facilitate other performance benefits.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method of realizing a performance benefit at a subscriber unit in a communications system with controlled performance, the method including:
    receiving a downlink signal;
    determining a performance metric corresponding to the downlink signal that complies with air interface requirements for the communications system;
    reporting said performance metric; and
    processing the downlink signal to provide a received signal having an improved performance metric.

2. The method of claim 1 wherein said receiving said downlink signal includes receiving a code division multiple access signal.

3. The method of claim 2 wherein said downlink signal has a power such that said performance metric corresponds to 1% frame error rate.

4. The method of claim 1 wherein said determining said performance metric corresponding to the downlink signal that complies with air interface requirements for the communications system is performed in parallel with said processing the downlink signal to provide a received signal having an improved performance metric.

5. The method of claim 4 wherein said receiving said downlink signal and said determining said performance metric corresponding to the downlink signal use a first receiver front end and a first decoder and said processing the downlink signal use said first receiver front end and a second receiver front end with outputs that are combined and decoded to provide said received signal having an improved performance metric.

6. The method of claim 1 further using one of a joint detection decoder and pilot interference cancellation to provide said received signal having said improved performance metric.

7. The method of claim 1 further including determining said performance metric to exceed the air interface requirements but not be equal to said improved performance metric.

8. The method of claim 1 wherein toll charges associated with service from the communications system are inversely correlated to the degree that said performance metric approaches said improved performance metric.

9. A subscriber unit arranged and constructed for realizing a performance benefit in a communications system with controlled performance, the subscriber unit comprising:
    a receiver for receiving a downlink signal;
    a processor coupled to the receiver for determining a performance metric corresponding to the downlink signal that complies with air interface requirements for the communications system;
    a transmitter for reporting said performance metric on an uplink channel; and
    a receiver processor for processing the downlink signal to provide a received signal having an improved performance metric.

10. The subscriber unit of claim 9 wherein said receiver for receiving said downlink signal is further receiving a code division multiple access signal.

11. The subscriber unit of claim 10 wherein said downlink signal has a power such that said performance metric corresponds to 1% frame error rate.

12. The subscriber unit of claim 9 wherein said processor for determining said performance metric corresponding to the downlink signal operates in parallel with said receiver processor for processing the downlink signal to provide a received signal having an improved performance metric.

13. The subscriber unit of claim 12 wherein said receiver for receiving said downlink signal and said processor for determining said performance metric corresponding to the downlink signal use a first receiver front end and a first decoder and said receiver processor for processing the downlink signal uses said first receiver front end and a second receiver front end with outputs that are combined and decoded to provide said received signal having an improved performance metric.

14. The subscriber unit of claim 9 wherein said receiver processor further uses one of a joint detection decoder and pilot interference cancellation to provide said received signal having said improved performance metric.

15. The subscriber unit of claim 9 further including determining said performance metric to exceed the air interface requirements but not be equal to said improved performance metric.

16. The subscriber unit of claim 9 wherein toll charges associated with service from the communications system are inversely correlated to the degree that said performance metric approaches said improved performance metric.

17. A method of realizing a performance benefit in a system with controlled performance, the benefit due to a subscriber unit having improved performance, the method comprising:

receiving, from the subscriber unit, a performance metric selected from the group consisting of a first performance metric corresponding to a downlink signal that complies with air interface requirements for the communications system and a second performance metric corresponding to said downlink signal that exceeds said air interface requirements for the communications system; and adjusting a transmit power to a first level for said downlink signal when said gust performance metric is received and to a second level that is less than said first level when said second performance metric is received, wherein said second performance metric is selected between said first performance metric and an improved performance metric according to the tolls associated with said second performance metric, thereby improving capacity for the system.

18. The method of claim 17 wherein said second performance metric is less than an improved performance metric that the subscriber unit is capable of, thereby improving the subscriber unit performance.

19. The method of claim 17 wherein said second performance metric is provided by the subscriber unit at the discretion of a user.

20. The method of claim 17 wherein said second performance metric is provided pursuant to terms and conditions of a service agreement.

* * * * *